Patented Aug. 14, 1934

1,969,761

UNITED STATES PATENT OFFICE 1,969,761

POLYHYDRIC ALCOHOL-CARBOXYLIC ORGANIC ACID-WEAK POLYBASIC INORGANIC PHENOL-ALDEHYDE CONDENSATION PRODUCT

Israel Rosenblum, Jackson Heights, N. Y.

REISSUED

No Drawing. Application April 4, 1930, Serial No. 441,731. Renewed October 17, 1933

20 Claims. (Cl. 260—8)

My invention relates to synthetic resins and has for its object to produce resinous condensation products of great complexity and extraordinarily high molecular weight with the aid of a polyhydric inorganic acid or its anhydride.

It is also an object of the present invention to produce synthetic resins of ready solubility in the common solvents such as mineral spirits, toluol, ethyl acetate, etc., and of substantially neutral reaction, good consistency and body, which are compatible with nitrocellulose and other cellulosic lacquers and may be used in conjunction therewith, and also with a great variety of natural and synthetic gums used in the lacquer and varnish industry.

It is well known that polyhydric alcohols, such as glycerol, may be either completely or partially esterified with monobasic or polybasic acids to produce esters which, in certain cases, are of resinous character or can be condensed or polymerized into resinous or approximately resinous substances by more or less prolonged heating at elevated temperatures. The reactions occurring during the formation of many of the synthetic resinous products are not thoroughly understood, but it is probable that during the first stages of the reaction a part of the polyhydric alcohol is under certain conditions only partially esterified (especially when an excess of the alcohol is present), and that during the subsequent heating the free hydroxyl groups of two or more molecules condense and become united through an oxygen bond to form a more complex molecule.

According to the present invention, a plurality of molecules of partially esterified polyhydric alcohols (which may or may not themselves be of resinous character) are united or condensed with the aid of an inorganic polybasic acid or its anhydride which directly forms the bond between such molecules. In this way, a plurality of large organic molecules may be condensed by an inorganic acid of relatively low molecular weight, so that a very complex product may be obtained with the use of a comparatively small quantity of inorganic acid. The relative quantities of reacting materials and the other conditions are so regulated that the complex substances so produced contain one or more free hydroxyl groups which are then caused to combine with an acidic reaction product of a phenol, an aldehyde and an organic salt of zinc or other metal, such as described in my United States Patent No. 1,809,570. In this manner I obtain very complex resins having highly desirable properties and composed of a polyhydric alcohol, a monobasic or polybasic organic acid, a polybasic inorganic acid, and the reaction product of a phenol, an aldehyde, and the organic salt of a metal.

In order that my invention may be better understood, I shall describe the same in connection with the production of complex resins from phthalic acid (or anhydride), glycerol, boric acid, and the acidic condensate obtained by condensing phenol and formaldehyde in the presence of an organic salt of zinc such as zinc abietate.

Phthalic acid may be caused to be combined in any known manner with an excess of glycerol to produce hydroxy-esters, of which the following simple compounds are illustrative:

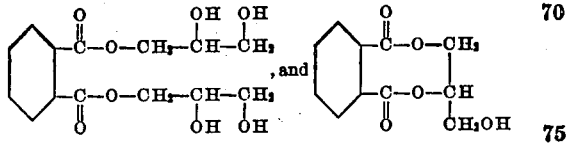

Other compounds are doubtless produced but only these are represented for the sake of simplicity as they are sufficient to illustrate the nature of the present invention. The mixture of hydroxy-esters is then caused to react with boric acid ($H_3BO_3$) at about 140–150° C., whereupon condensation takes place producing, among other compounds, the following comparatively simple compound (assuming that one molecule of boric acid reacts with a molecule of each of the hydroxy-esters formulated above):

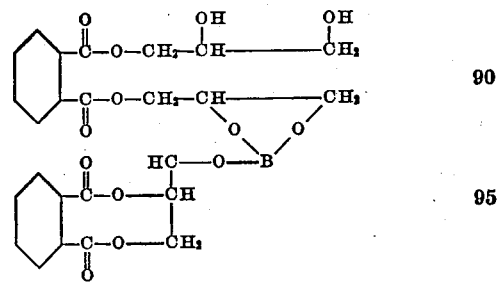

The above compound probably represents only an intermediate product, for the two free hydroxyls may condense with the hydroxyl groups of similar products or of non-boronized hydroxyesters, either directly or with the aid of additional boric acid. It will thus be seen that extreme complexity of molecular structure may be obtained in a number of ways with the aid of the inorganic acid.

The boronized condensates obtained as indicated above are characterized by great body, a property which has heretofore been imparted to glycerol-phthalic acid resins only with the aid of additions, such as rosin.

Products of greater solubility and flexibility may, in accordance with the present invention, be obtained by treating the boronized hydroxy-esters with acids until the same are substantially neutral. Organic acids of any kind may be employed, such as acetic, succinic, tartaric, benzoic, phthalic, etc., and also resin acids, either natural or synthetic. Excellent results are obtained by the use of the higher aliphatic acids, such as oleic, linoleic, linolenic, ricinoleic, stearic, palmitic, and other acids obtainable from drying and non-drying oils. In general, I prefer to employ rosin or other natural resin (which is, of course, acidic in nature) in conjunction with any of the acids just specified. Improved results are generally obtained if the natural resin, if used, is first cracked or dry-distilled, as by heating to a temperature of about 260° C. or above. I may also employ, either alone or together with linoleic or any of the other acids mentioned, a condensation product of phenol, formaldehyde, a natural resin, such as rosin, and an organic salt, such as a zinc soap, specifically zinc abietate, as described in my above mentioned patent. The acidic compounds just enumerated will combine with the boronized hydroxy-esters of glycerol and phthalic acid and at least partially neutralize the same, thereby producing extremely complex esters of glycerol with phthalic acid, boric acid, and one or more of the other organic acids mentioned above.

The treatment of the boronized hydroxy-esters with the acids mentioned above are described and, excepting the treatment with the phenol-formaldehyde condensation product, claimed in my co-pending application, Serial No. 438,901, filed March 25, 1930. The present application is in the nature of a division of such earlier filed case and is directed to the treatment of the boronized hydroxy-esters with a phenol-aldehyde condensate and to the products obtained thereby.

As indicated above, and as preferably carried out, the reaction between the partial ester of glycerol and phthalic acid and the boric acid is made to take place under such proportions and conditions that the resulting product contains free basic hydroxyl groups. As is well known, the reaction product of phenol and formaldehyde at an advanced, though still soluble, stage of condensation is usually of acidic nature, particularly if the condensation is made to take place in the presence of rosin or other natural resin. I have found that the hydroxy boronized condensate can be made to combine with the acidic phenolic condensate to produce a substantially neutral, highly complex resin having very valuable properties, particularly with regard to solubility, body, luster and compatibility with cellulosic and other lacquers and varnishes.

The reaction may be made to occur in steps, as by first treating the phthalic acid with glycerol and then reacting the hydroxy-esters so produced with boric acid and finally heating the boronized hydroxy-esters with the phenolic condensate until a substantially neutral product is obtained; or else all of the ingredients in proper proportions may be made to react simultaneously.

Instead of combining the condensate of boric acid with the mono and tetra-hydroxy glycerol-phthalic acid esters (or other hydroxy-esters) directly with the phenolic condensate, the free basic hydroxyls of these boronized esters may be combined with the acidic compounds obtained by condensing with an excess of boric acid the hydroxy-esters obtained by partially neutralizing gylcerol with an acidic phenolic condensate, preferably one formed in the presence of an organic salt. In this way, complex compounds are obtained in which what may be regarded as a nucleus composed of an ester of glycerol and phthalic acid is joined through boron bonds to one or more other glycerol-phthalic acid esters and to one or more glycerol esters of phenolic condensates. As an example of the phenol condensates, I may mention the acidic reaction product of phenol, formaldehyde, rosin (or other natural resin), with an organic salt (preferably of a high molecular weight fatty acid, such as abietic acid) of zinc or other metal, such as calcium, strontium, barium, magnesium, lead, etc. Instead of partially neutralizing glycerol with an acidic phenolic condensate, as stated above, I may partially neutralize it with such condensate together with rosin or other natural resin, or together with any of the other organic acids listed hereinabove. In general, I prefer to use, in place of the rosin as it is commercially available, rosin which has been heated or cracked in the presence of an organic zinc (or other metal) salt-phenol-aldehyde condensate. By the use of such zinc-phenol-aldehyde condensate, the product is made more resistant, while at the same time the formation of compounds, which crystallize out from ethyl acetate solution and consequently are not colloidal or film-forming, is prevented. It will be understood that, in place of rosin, other resins, such as the fossil resins, may be employed which are similarly dry-distilled or cracked, preferably in the presence of an organic salt-phenol-formaldehyde condensate.

By the above procedure, extremely complex resins are obtained which are highly weather and waterproof, have excellent body and are compatible with cellulosic lacquers. My novel boronized condensates produce varnishes having a very glossy and lustrous surface. They also make excellent wood fillers.

Condensates of somewhat different properties may be obtained, according to my invention, by treating an excess of glycerol with boric acid and then reacting the hydroxy-esters so obtained with a synthetic resin of acidic nature, such as a phenol-formaldehyde resin, and preferably one produced in the presence of rosin and an organic salt of zinc or other metal, such as calcium, lead, tin, or any of the other metals mentioned in my United States Patent No. 1,809,570. Instead of first boronizing the glycerol, all of the reacting compounds may be mixed together and heated. By the use of boric acid a resin of improved properties is obtained in which the condensation is more complete.

Several modes of carrying out my invention are described hereinbelow, but it will be understood that the examples are given by way of illustration only and are not to be construed in a limiting sense.

*Example 1.*—148 grams of phthalic anhydride, 31 grams of boric acid and 150 grams of glycerol are heated together with 50 grams of the acidic condensate obtained by condensing phenol, formaldehyde, and an organic salt of a metal, such as zinc, in the presence of a solvent or flux, such as natural resins and drying and non-drying oils, as described in my aforementioned United States patent, and 140 grams of stearic acid. The temperature is maintained at about 240° C. until a sample is found to be completely soluble in toluol. The resin obtained is compatible with solutions of nitrocellulose.

Example 2.—280 grams of linoleic acid, 200 grams of glycerol (98% pure), and 31 grams of boric acid are heated at about 180° C. for two hours. There are then added 74 grams of phthalic anhydride and 300 grams of an organic zinc salt-phenol-formaldehyde condensate (prepared as described in my aforementioned patent). The temperature is permitted to rise to about 230° C. and kept at that temperature until a sample of the product forms a clear solution in toluol.

Example 3.—The procedure outlined under Example 2 is followed except that, in place of part of the zinc salt-phenol-formaldehyde condensate, there is used an equivalent quantity of dry-distilled or non-distilled rosin or any dry-distilled fossil gum.

Example 4.—280 grams of linoleic acid, 200 grams of glycerol (98% pure) and 62 grams of boric acid are heated to about 180° C. for two hours. There are then added 600 grams of the acidic condensate obtained from the interaction of 60 grams of phenol, 60 grams of formaldehyde, 3 grams of zinc abietate (or equivalent amount of oxide), and 600 grams of rosin, with or without a catalyst, as described in my above mentioned patent. As indicated in said application, there may be used the organic salts of other metals than zinc, for example the acetate benzoate, stearate, palmitate, abietate, etc. of calcium, barium, strontium, magnesium, tin, lead, etc. The temperature is permitted to rise to about 230° C. and kept at that temperature until a sample of the product forms a clear solution in toluol.

Example 5.—The same as Example 4 except that no zinc abietate is used in the preparation of the phenolic condensate.

If desired, an excess of fatty acids may be employed in the examples given above because the same are compatible with my novel boronized condensates.

As indicated above, any suitable polyhydric alcohol other than glycerol may be used, such as glycol, mannitol, etc.; in place of phthalic acid any other organic acid, or its anhydride, monobasic or polybasic, may be used, such as succinic, tartaric, malic, maleic, etc., or any of the high molecular weight acids mentioned above; and in place of boric acid any other suitable polyhydric inorganic acid, such as telluric, phosphoric, arsenic, silicic acids, etc., or their anhydrides, may be employed. If desired, the reactions described hereinabove may be made to take place in the presence of a natural resin, preferably dry-distilled, which may act as a solvent, or may supply one of the reacting acids.

Variations may be resorted to within the scope of the appended claims without departing from the spirit of the invention.

What is claimed is:

1. The method of producing complex resinous condensation products, which comprises heating a polyhydric alcohol, a carboxylic organic acid, a weak polybasic inorganic acid, and an acidic phenol-aldehyde resin until a substantially neutral, clear condensate soluble in toluol is obtained.

2. The method of producing complex resinous condensation products, which comprises heating a polyhydric alcohol, a polybasic carboxylic organic acid, a weak polybasic inorganic acid, and an acidic phenol-aldehyde resin until a substantially neutral, clear condensate soluble in toluol is obtained.

3. The method of producing complex resinous condensation products, which comprises heating a polyhydric alcohol, a carboxylic organic acid, a weak polybasic inorganic acid, and an acidic phenol-formaldehyde resin until a substantially neutral, clear condensate soluble in toluol is obtained.

4. The method of producing complex resinous condensation products, which comprises heating a polyhydric alcohol, phthalic acid, a weak polybasic inorganic acid, and an acidic phenol-aldehyde resin until a substantially neutral, clear condensate soluble in toluol is obtained.

5. The method of producing complex resinous condensation products, which comprises heating glycerol, phthalic acid, a weak polybasic inorganic acid, and an acidic phenol-aldehyde resin until a substantially neutral, clear condensate soluble in toluol is obtained.

6. The method of producing complex resinous condensation products, which comprises heating glycerol, phthalic acid, boric acid, and an acidic phenol-aldehyde resin until a substantially neutral, clear condensate soluble in toluol is obtained.

7. The method of producing complex resinous condensation products, which comprises heating glycerol, phthalic acid, boric acid, and an acidic organic material comprising a phenol-formaldehyde condensate until a substantially neutral, clear condensate soluble in toluol is obtained.

8. The method of producing complex resinous condensation products, which comprises heating glycerol, phthalic acid, boric acid, and an acidic organic material comprising a phenol-formaldehyde-carboxylic acid salt condensate until a substantially neutral, clear condensate soluble in toluol is obtained.

9. The method of producing complex resinous condensation products, which comprises heating glycerol, phthalic acid, boric acid, and an acidic organic material comprising a phenol-formaldehyde-carboxylic acid zinc salt condensate and a natural resin until a substantially neutral, clear condensate soluble in toluol is obtained.

10. The method which comprises partially esterifying a quantity of glycerol with a carboxylic organic acid in the presence of a weak polybasic inorganic acid in quantities less than the theoretical quantity required completely to neutralize the glycerol, whereby hydroxyl-containing esters are produced, and heating the resulting mass with a phenol-aldehyde condensate of acidic reaction at elevated temperatures to effect at least partial neutralization of the esters by said condensate.

11. The method which comprises partially esterifying a quantity of glycerol with a carboxylic organic acid in the presence of a weak polybasic inorganic acid, and then heating the mass with the reaction product of a phenol, aldehyde and a salt of a carboxylic acid until a clear, substantially neutral, soluble complex resinous condensate is obtained.

12. The method which comprises heating a partial organic acid ester of glycerol having free hydroxyl groups with a quantity of a weak polybasic inorganic acid which is less than the theoretical quantity required to neutralize all of the hydroxyl groups, whereby a condensate having still free hydroxyl groups is obtained, and then reacting said condensate with a soluble acidic condensate of a phenol and an aldehyde at elevated temperatures to effect at least partial neutralization of one condensate by the other.

13. The method which comprises heating a partial organic acid ester of glycerol having free hydroxyl groups with a quantity of a weak polybasic inorganic acid which is less than the theoretical quantity required to neutralize all of the hydroxyl groups, whereby a condensate having still free hydroxyl groups is obtained, and then reacting said condensate with a fusible condensate of phenol, formaldehyde and zinc abietate at elevated temperatures to effect at least partial neutralization of one condensate by the other.

14. The method which comprises heating a partial organic acid ester of glycerol having free hydroxyl groups with a weak polybasic inorganic acid and at least one acidic organic compound comprising a phenol-aldehyde condensate containing a zinc salt of a carboxylic acid, whereby said hydroxyl-containing ester is caused to neutralize at least in part the inorganic and organic acidic compounds.

15. A soluble polyhydric alcohol-carboxylic-organic acid-weak polybasic inorganic acid-phenol-aldehyde resin condensation product.

16. A soluble resinous condensation product having the general formula R—(O—R')$x$, wherein R is a weak polybasic inorganic acid-forming element, R' the residue of a basic hydroxylated organic substance containing a phenol-aldehyde condensate, and $x$ has the value of two or more.

17. A soluble resinous condensation product having the general formula R—(O—R')$x$, wherein R is a weak polybasic inorganic acid-forming element, R' the residue of a basic hydroxylated organic substance including a partial glycerol ester of an acidic phenol-aldehyde condensate, and $x$ has the value of two or more.

18. A soluble resinous condensation product having the general formula B—(O—R')$_3$, wherein B is the element boron, and R' is the residue of a basic hydroxylated organic substance containing a phenol-aldehyde condensate.

19. A soluble resinous condensation product having the general formula B—(O—R')$_3$, in which B is the element boron, and R' is the residue of at least two basic hydroxylated organic substances, including a partial ester of glycerol and phthalic acid, and a partial ester of glycerol and a phenol-formaldehyde-carboxylic-acid zinc salt-rosin condensate.

20. A soluble resinous condensation product comprising a boronized glycerol organic ester condensate neutralized with a phenolformaldehyde-carboxylic acid salt condensate.

ISRAEL ROSENBLUM.